US012549143B2

(12) United States Patent
Singhal et al.

(10) Patent No.: US 12,549,143 B2
(45) Date of Patent: Feb. 10, 2026

(54) POWER AMPLIFIER WITH CURRENT REUSE

(71) Applicant: Apple Inc., Cupertino, CA (US)

(72) Inventors: Nitesh Singhal, Santa Clara, CA (US); Mark G Forbes, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 361 days.

(21) Appl. No.: 18/082,412

(22) Filed: Dec. 15, 2022

(65) Prior Publication Data

US 2024/0097628 A1    Mar. 21, 2024

Related U.S. Application Data

(60) Provisional application No. 63/408,360, filed on Sep. 20, 2022.

(51) Int. Cl.
*H03F 3/24* (2006.01)
*H03F 1/02* (2006.01)
(Continued)

(52) U.S. Cl.
CPC .......... *H03F 3/245* (2013.01); *H03F 1/0222* (2013.01); *H03F 3/195* (2013.01); *H04B 1/0458* (2013.01);
(Continued)

(58) Field of Classification Search
CPC .... C12N 15/907; C12N 2310/20; C12N 9/22; H03F 1/0222; H03F 1/0283;
(Continued)

(56) References Cited

U.S. PATENT DOCUMENTS

| 6,236,273 | B1 | 5/2001 | Lewyn |
| 7,193,459 | B1* | 3/2007 | Epperson ................. H03F 3/24 |
|  |  |  | 330/296 |
| 7,768,350 | B2 | 8/2010 | Srinivasan et al. |
| 7,843,038 | B2 | 11/2010 | Seremeta |

(Continued)

FOREIGN PATENT DOCUMENTS

| EP | 3832886 A1 | 6/2021 |
| WO | 2008103757 A1 | 8/2008 |

OTHER PUBLICATIONS

Vittorio Giammello et al., A Transformer-Coupling Current-Reuse SiGe HBT Power Amplifier for 77-GHz Automotive Radar, IEEE Transactions on Microwave Theory and Techniques, May 25, 2012, pp. 1676-1683, vol. 60, No. 6, IEEE.

*Primary Examiner* — Nguyen T Vo
(74) *Attorney, Agent, or Firm* — Treyz Law Group, P.C.; Tianyi He

(57) ABSTRACT

An electronic device may include wireless circuitry with a processor, a transceiver, an antenna, and a front-end module coupled between the transceiver and the antenna. The front-end module may include one or more power amplifiers for amplifying a signal for transmission through the antenna. A power amplifier may include multiple amplifier stages. Current sharing or reuse may occur between two amplifier stages in the power amplifier via a current flow path between the two amplifier stages. A power supply voltage line may be connected to the current flow path and may provide the downstream amplifier stage with a supplemental supply current based on which the downstream amplifier stage can amplify a radio-frequency signal received from the upstream amplifier stage.

20 Claims, 9 Drawing Sheets

(51) Int. Cl.
*H03F 3/195* (2006.01)
*H04B 1/04* (2006.01)

(52) U.S. Cl.
CPC .. *H03F 2200/451* (2013.01); *H03F 2200/534* (2013.01); *H03F 2200/537* (2013.01); *H03F 2200/541* (2013.01); *H04B 2001/0408* (2013.01)

(58) Field of Classification Search
CPC ......... H03F 2200/168; H03F 2200/408; H03F 2200/451; H03F 2200/516; H03F 2200/534; H03F 2200/537; H03F 2200/541; H03F 3/195; H03F 3/245; H03F 3/265; H03F 3/45183; H04B 1/0458; H04B 2001/0408; G16B 20/30; G16B 30/10
See application file for complete search history.

(56) References Cited

U.S. PATENT DOCUMENTS

| | | | |
|---|---|---|---|
| 7,915,961 B1 * | 3/2011 | Li | H03F 1/0261 |
| | | | 330/297 |
| 8,031,019 B2 | 10/2011 | Chawla et al. | |
| 9,130,636 B2 | 9/2015 | Chakraborty et al. | |
| 9,401,737 B1 | 7/2016 | Rossi et al. | |
| 9,991,850 B2 | 6/2018 | Lehtola | |
| 10,079,582 B2 | 9/2018 | Gathman | |
| 2011/0133838 A1 * | 6/2011 | Paul | H03F 3/505 |
| | | | 330/296 |
| 2019/0068147 A1 | 2/2019 | Nakano et al. | |
| 2019/0079549 A1 * | 3/2019 | Lam | H03F 3/213 |
| 2020/0212849 A1 * | 7/2020 | Kobayashi | H03F 3/195 |
| 2021/0367559 A1 | 11/2021 | Kawasaki | |
| 2022/0337209 A1 * | 10/2022 | Yamada | H03F 3/50 |
| 2023/0318538 A1 * | 10/2023 | Honda | H03F 3/193 |
| 2025/0088161 A1 * | 3/2025 | Takenaka | H03H 7/42 |

* cited by examiner

POWER AMPLIFIER WITH CURRENT REUSE

This application claims the benefit of U.S. provisional patent application No. 63/408,360, filed on Sep. 20, 2022, which is hereby incorporated by reference herein in its entirety.

FIELD

This disclosure relates generally to electronic devices and, more particularly, to electronic devices with wireless communications circuitry.

BACKGROUND

Electronic devices are often provided with wireless communications capabilities. An electronic device with wireless communications capabilities has wireless communications circuitry with one or more antennas. Wireless transceiver circuitry in the wireless communications circuitry uses the antennas to transmit and receive radio-frequency signals.

Radio-frequency signals transmitted by an antenna are often fed through one or more power amplifiers, which are configured to amplify low power analog signals to higher power signals more suitable for transmission through the air over long distances. It can be challenging to design a satisfactory power amplifier for an electronic device.

SUMMARY

An electronic device may include wireless communications circuitry. The wireless communications circuitry may include one or more processors for generating digital signals, a transceiver for receiving the digital signals and for generating corresponding radio-frequency signals, and one or more radio-frequency power amplifiers configured to amplify the radio-frequency signals for transmission by one or more antenna in the electronic device. A power amplifier may include multiple sequential amplifier stages. These amplifier stages may include one or more common-source amplifier stages, one or more common-gate amplifier stages, and/or one or more cascode amplifier stages.

Current sharing or reuse may occur between two amplifier stages in the power amplifier via a current flow path between the two amplifier stages. A power supply voltage line may be connected to the current flow path and may provide the downstream amplifier stage with supplemental supply current in order to for the downstream amplifier stage to amplify a radio-frequency signal received from the upstream amplifier stage. The upstream amplifier stage may receive and operate using a first positive power supply voltage and a second positive power supply voltage. The downstream amplifier stage may receive and operate using the second positive power supply voltage and a ground power supply voltage. The voltage difference between the first and second positive power supply voltages may be less than the voltage difference between the second positive power supply voltage and the ground power supply voltage.

An aspect of the disclosure provides a radio-frequency power amplifier. The radio-frequency power amplifier can include a first transistor having a source terminal, a second transistor having a drain terminal, a first transformer having a primary inductor coupled to the first transistor and having a secondary inductor coupled to the second transistor, and a second transformer that couples the source terminal of the first transistor to the drain terminal of the second transistor and that is configured to receive a power supply voltage.

An aspect of the disclosure provides radio-frequency power circuitry. The radio-frequency amplifier circuitry can include a first amplifier stage, a second amplifier stage configured to receive a radio-frequency signal from the first amplifier stage, and an output transformer coupled to the second amplifier stage. The output transformer can be coupled to the first amplifier stage and configured to receive a positive power supply voltage.

An aspect of the disclosure provides an electronic device. The electronic device can include one or more processors configured generate transmit signals, a transceiver configured to generate radio-frequency signals based on the transmit signals, and power amplifier circuitry configured to amplify the radio-frequency signals for wireless transmission by an antenna. The power amplifier circuitry can include a first transistor and a second transistor, the first transistor and the second transistor having a common source terminal and can include a third transistor and a fourth transistor, the third transistor and the fourth transistor having a common source terminal. The common source terminal of the first transistor and the second transistor can be coupled to the drain terminal of the third transistor and coupled to the drain terminal of the second transistor. The drain terminal of the third transistor and the drain terminal of the fourth transistor can be configured to receive a supply voltage terminal.

DETAILED DESCRIPTION

An electronic device may be provided with wireless transmitter circuitry. The wireless transmitter circuitry may include a transmitter circuit for outputting a transmit signal, a radio-frequency power amplifier for amplifying the transmit signal, and an antenna for radiating the amplified signal.

The radio-frequency power amplifier may include multiple amplifier stages such as one or more common-source amplifier stages, one or more common-gate amplifier stages, one or more cascode amplifier stages, etc. Power losses may be incurred along the transmit (uplink) path (e.g., when impedance matching between amplifier stages, between the power amplifier and a preceding stage, between the power amplifier and a succeeding stage, etc.). To make up for the power losses while achieving certain amplifier performance parameters, it may be desirable for portions of the power amplifier to draw additional current.

Accordingly, the radio-frequency power amplifier may implement a current reuse scheme between two amplifier stages while making use of a more efficiently generated power supply voltage. A first amplifier stage may be an upstream stage preceding a second amplifier stage in the transmit path. The first amplifier stage may operate with a first power supply voltage and a second power supply voltage, while the second amplifier stage may operate with the second power supply voltage and a third (ground) power supply voltage. A power supply voltage line supplying the second power supply voltage may be directly connected to the second amplifier stage to supply any supplemental current desired to operate the second amplifier stage. If desired, a difference between the first and second power supply voltages may be less than a difference between the second and third power supply voltages (e.g., to reduce power consumption in the first amplifier stage). The present embodiments describe various implementations of a current reuse scheme between amplifier stages that includes a supplemental current supply path which can be used to improve the power consumption of the radio-frequency power amplifier while preserving the fidelity of the transmitted signal.

Figure 1:
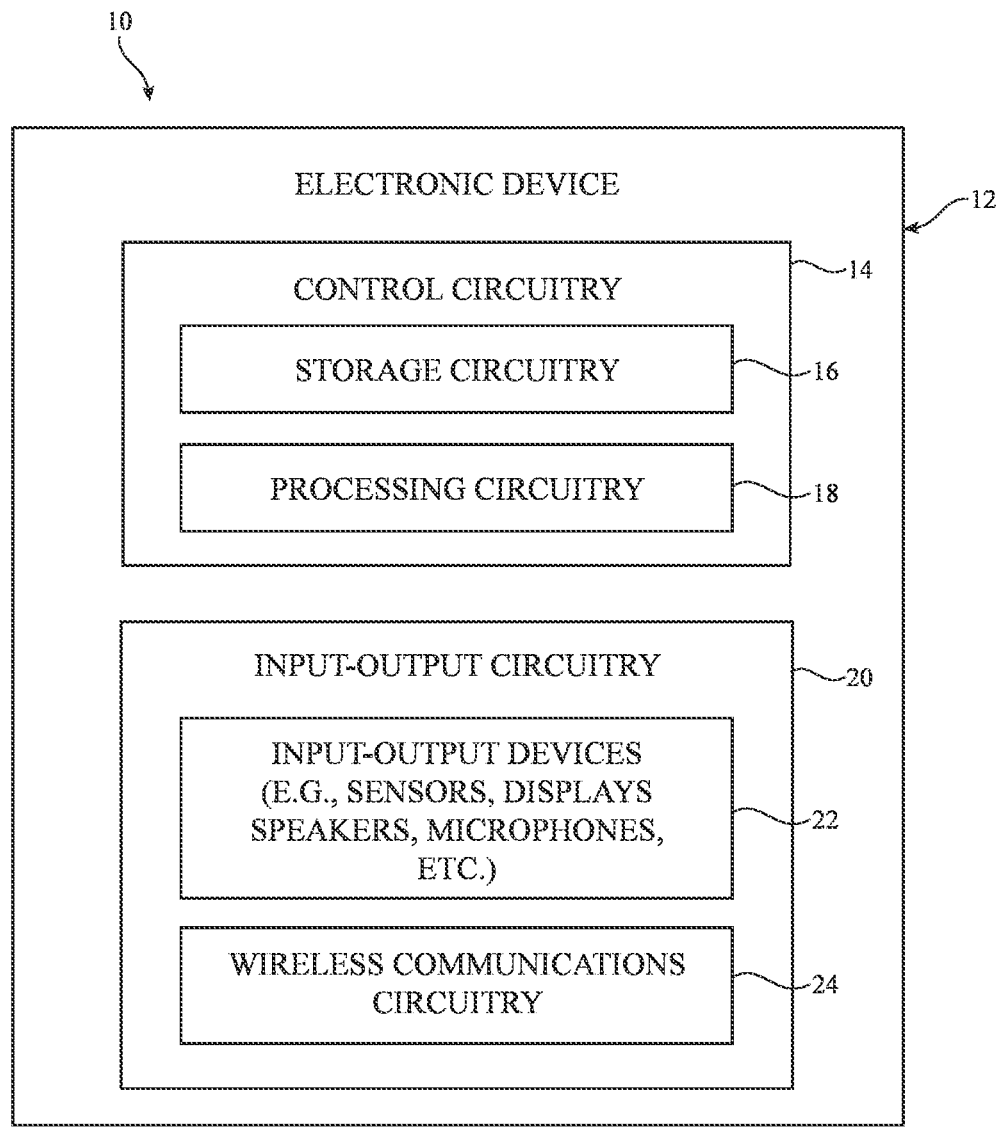
FIG. 1 is a diagram of an illustrative electronic device having wireless communications circuitry in accordance with some embodiments.

FIG. 1 is a diagram of an electronic device such as electronic device 10 that can be provided with such wireless transmitter circuitry. Electronic device 10 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in the schematic diagram FIG. 1, device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, parts or all of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more microprocessors, microcontrollers, digital signal processors, host processors, baseband processor integrated circuits, application processors, application specific integrated circuits, central processing units (CPUs), general purpose processors, or other types of processors. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 5G New Radio (NR) protocols, etc.), MIMO protocols, antenna diversity protocols, satellite navigation system protocols (e.g., global positioning system (GPS) protocols, global navigation satellite system (GLONASS) protocols, etc.), antenna-based spatial ranging protocols (e.g., radio detection and ranging (RADAR) protocols or other desired range detection protocols for signals conveyed at millimeter and centimeter wave frequencies), or any other desired communications protocols. Each communications protocol may be associated with a corresponding radio access technology (RAT) that specifies the physical connection methodology used in implementing the protocol.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include user interface devices, data port devices, and other input-output components. For example, input-output devices 22 may include touch sensors, displays, light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), etc. In some configurations, keyboards, headphones, displays, pointing devices such as trackpads, mice, electronic pencil (e.g., a stylus), and joysticks, and other input-output devices may be coupled to device 10 using wired or wireless connections (e.g., some of input-output devices 22 may be peripherals that are coupled to a main processing unit or other portion of device 10 via a wired or wireless link).

Input-output circuitry 20 may include wireless communications circuitry such as wireless communications circuitry 24 (sometimes referred to herein as wireless circuitry 24) for wirelessly conveying radio-frequency signals. While control circuitry 14 is shown separately from wireless communications circuitry 24 for the sake of clarity, wireless communications circuitry 24 may include processing circuitry that forms a part of processing circuitry 18 and/or storage circuitry that forms a part of storage circuitry 16 of control circuitry 14 (e.g., portions of control circuitry 14 may be implemented on wireless communications circuitry 24). As an example, control circuitry 14 (e.g., processing circuitry 18) may include processor circuitry or other control components that form a part of wireless communications circuitry 24.

Wireless communications circuitry 24 may include radio-frequency (RF) transceiver circuitry formed from one or more integrated circuits, power amplifier circuitry configured to amplify uplink radio-frequency signals (e.g., radio-frequency signals transmitted by device 10 to an external device), low-noise amplifiers configured to amplify downlink radio-frequency signals (e.g., radio-frequency signals received by device 10 from an external device), passive radio-frequency components, one or more antennas, transmission lines, and other circuitry for handling radio-frequency wireless signals. Wireless signals can also be sent using light (e.g., using infrared communications).

Wireless circuitry 24 may include radio-frequency transceiver circuitry for handling transmission and/or reception of radio-frequency signals in various radio-frequency communications bands. For example, the radio-frequency transceiver circuitry may handle wireless local area network (WLAN) communications bands such as the 2.4 GHz and 5 GHz Wi-Fi® (IEEE 802.11) bands, wireless personal area network (WPAN) communications bands such as the 2.4 GHz Bluetooth® communications band, cellular telephone communications bands such as a cellular low band (LB) (e.g., 600 to 960 MHz), a cellular low-midband (LMB) (e.g., 1400 to 1550 MHz), a cellular midband (MB) (e.g., from 1700 to 2200 MHz), a cellular high band (HB) (e.g., from 2300 to 2700 MHz), a cellular ultra-high band (UHB) (e.g., from 3300 to 5000 MHz), or other cellular communications bands between about 600 MHz and about 5000 MHz (e.g., 3G bands, 4G LTE bands, 5G New Radio Frequency Range 1 (FR1) bands below 10 GHz, 5G New Radio Frequency Range 2 (FR2) bands at millimeter and centimeter wavelengths between 20 and 60 GHz, etc.), a near-field communications (NFC) band (e.g., at 13.56 MHz), satellite navigations bands (e.g., an L1 global positioning system (GPS) band at 1575 MHz, an L5 GPS band at 1176 MHz, a Global Navigation Satellite System (GLONASS) band, a BeiDou Navigation Satellite System (BDS) band, etc.), an ultra-wideband (UWB) communications band supported by the IEEE 802.15.4 protocol and/or other UWB communications protocols (e.g., a first UWB communications band at 6.5 GHz and/or a second UWB communications band at 8.0 GHz), and/or any other desired communications bands. The communications bands handled by such radio-frequency transceiver circuitry may sometimes be referred to herein as frequency bands or simply as "bands," and may span corresponding ranges of frequencies. In general, the radio-frequency transceiver circuitry within wireless circuitry 24 may cover (handle) any desired frequency bands of interest.

Figure 2:
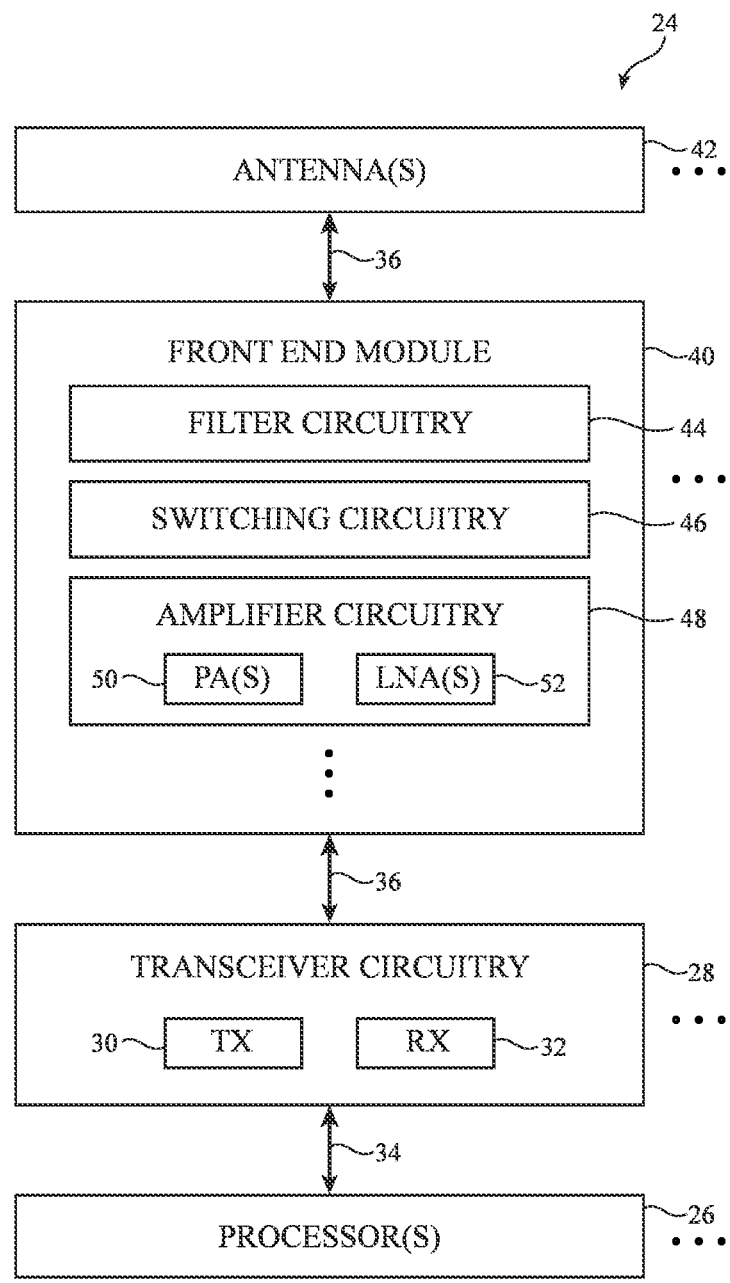
FIG. 2 is a diagram of illustrative wireless communications circuitry having amplifier circuitry in accordance with some embodiments.

FIG. 2 is a diagram showing illustrative components within wireless circuitry 24. As shown in FIG. 2, wireless circuitry 24 may include a processor such as processor 26, radio-frequency (RF) transceiver circuitry such as radio-frequency transceiver 28, radio-frequency front end circuitry such as radio-frequency front end module (FEM) 40, and antenna(s) 42. Processor 26 may be a baseband processor, application processor, general purpose processor, microprocessor, microcontroller, digital signal processor, host processor, or other type of processor. Processor 26 may be coupled to transceiver 28 over path 34. Transceiver 28 may be coupled to antenna 42 via radio-frequency transmission line path 36. Radio-frequency front end module 40 may be disposed on radio-frequency transmission line path 36 between transceiver 28 and antenna 42.

In the example of FIG. 2, wireless circuitry 24 is illustrated as including only a single processor 26, a single transceiver 28, a single front end module 40, and a single antenna 42 for the sake of clarity. In general, wireless circuitry 24 may include any desired number of processors 26, any desired number of transceivers 28, any desired number of front end modules 40, and any desired number of antennas 42. Each processor 26 may be coupled to one or more transceiver 28 over respective paths 34. Each transceiver 28 may include a transmitter circuit 30 configured to output uplink signals to antenna 42, may include a receiver circuit 32 configured to receive downlink signals from antenna 42, and may be coupled to one or more antennas 42 over respective radio-frequency transmission line paths 36. Each radio-frequency transmission line path 36 may have a respective front end module 40 disposed thereon. If desired, two or more front end modules 40 may be disposed on the same radio-frequency transmission line path 36. If desired, one or more of the radio-frequency transmission line paths 36 in wireless circuitry 24 may be implemented without any front end module disposed thereon.

Radio-frequency transmission line path 36 may be coupled to an antenna feed on antenna 42. The antenna feed may, for example, include a positive antenna feed terminal and a ground antenna feed terminal. Radio-frequency transmission line path 36 may have a positive transmission line signal path such that is coupled to the positive antenna feed terminal on antenna 42. Radio-frequency transmission line path 36 may have a ground transmission line signal path that is coupled to the ground antenna feed terminal on antenna 42. This example is merely illustrative and, in general, antennas 42 may be fed using any desired antenna feeding scheme. If desired, antenna 42 may have multiple antenna feeds that are coupled to one or more radio-frequency transmission line paths 36.

Radio-frequency transmission line path 36 may include transmission lines that are used to route radio-frequency antenna signals within device 10 (FIG. 1). Transmission lines in device 10 may include coaxial cables, microstrip transmission lines, stripline transmission lines, edge-coupled microstrip transmission lines, edge-coupled stripline transmission lines, transmission lines formed from combinations of transmission lines of these types, etc. Transmission lines in device 10 such as transmission lines in radio-frequency transmission line path 36 may be integrated into rigid and/or flexible printed circuit boards.

In performing wireless transmission, processor(s) 26 may provide transmit signals (e.g., digital or baseband signals) to transceiver 28 over path 34. Transceiver 28 may further include circuitry for converting the transmit (baseband) signals received from processor 26 into corresponding radio-frequency signals. For example, transceiver circuitry 28 may include mixer circuitry for up-converting (or modulating) the transmit (baseband) signals to radio-frequencies prior to transmission over antenna 42. The example of FIG. 2 in which processor 26 communicates with transceiver 28 is merely illustrative. In general, transceiver 28 may communicate with a baseband processor, an application processor, general purpose processor, a microcontroller, a microprocessor, or one or more processors within circuitry 18. Transceiver circuitry 28 may also include digital-to-analog converter (DAC) and/or analog-to-digital converter (ADC) circuitry for converting signals between digital and analog domains. Transceiver 28 may use transmitter (TX) 30 to transmit the radio-frequency signals over antenna 42 via radio-frequency transmission line path 36 and front end module 40. Antenna 42 may transmit the radio-frequency signals to external wireless equipment by radiating the radio-frequency signals into free space.

In performing wireless reception, antenna 42 may receive radio-frequency signals from the external wireless equipment. The received radio-frequency signals may be conveyed to transceiver 28 via radio-frequency transmission line path 36 and front end module 40. Transceiver 28 may include circuitry such as receiver (RX) 32 for receiving signals from front end module 40 and for converting the received radio-frequency signals into corresponding baseband signals. For example, transceiver 28 may include mixer circuitry for down-converting (or demodulating) the received radio-frequency signals to baseband frequencies prior to conveying the received signals to processor 26 over path 34.

Front end module (FEM) 40 may include radio-frequency front end circuitry that operates on the radio-frequency signals conveyed (transmitted and/or received) over radio-frequency transmission line path 36. FEM 40 may, for example, include front end module (FEM) components such as radio-frequency filter circuitry 44 (e.g., low pass filters, high pass filters, notch filters, band pass filters, multiplexing circuitry, duplexer circuitry, diplexer circuitry, triplexer circuitry, etc.), switching circuitry 46 (e.g., one or more radio-frequency switches), radio-frequency amplifier circuitry 48 (e.g., one or more power amplifier circuits 50 and/or one or more low-noise amplifier circuits 52), impedance matching circuitry (e.g., circuitry that helps to match the impedance of antenna 42 to the impedance of radio-frequency transmission line 36), antenna tuning circuitry (e.g., networks of capacitors, resistors, inductors, and/or switches that adjust the frequency response of antenna 42), radio-frequency coupler circuitry, charge pump circuitry, power management circuitry, digital control and interface circuitry, and/or any other desired circuitry that operates on the radio-frequency signals transmitted and/or received by antenna 42. Each of the front end module components may be mounted to a common (shared) substrate such as a rigid printed circuit board substrate or flexible printed circuit substrate. If desired, the various front end module components may also be integrated into a single integrated circuit chip.

Filter circuitry 44, switching circuitry 46, amplifier circuitry 48, and other circuitry may be disposed along radio-frequency transmission line path 36, may be incorporated into FEM 40, and/or may be incorporated into antenna 42 (e.g., to support antenna tuning, to support operation in desired frequency bands, etc.). These components, sometimes referred to herein as antenna tuning components, may be adjusted (e.g., using control circuitry 14) to adjust the frequency response and wireless performance of antenna 42 over time.

Transceiver 28 may be separate from front end module 40. For example, transceiver 28 may be formed on another substrate such as the main logic board of device 10, a rigid printed circuit board, or flexible printed circuit that is not a part of front end module 40. While control circuitry 14 is shown separately from wireless circuitry 24 in the example of FIG. 1 for the sake of clarity, wireless circuitry 24 may include processing circuitry that forms a part of processing circuitry 18 and/or storage circuitry that forms a part of storage circuitry 16 of control circuitry 14 (e.g., portions of control circuitry 14 may be implemented on wireless circuitry 24). As an example, processor 26 and/or portions of transceiver 28 (e.g., a host processor on transceiver 28) may form a part of control circuitry 14. Control circuitry 14 (e.g., portions of control circuitry 14 formed on processor 26, portions of control circuitry 14 formed on transceiver 28, and/or portions of control circuitry 14 that are separate from wireless circuitry 24) may provide control signals (e.g., over one or more control paths in device 10) that control the operation of front end module 40.

Transceiver circuitry 28 may include wireless local area network transceiver circuitry that handles WLAN communications bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network transceiver circuitry that handles the 2.4 GHz Bluetooth® band or other WPAN communications bands, cellular telephone transceiver circuitry that handles cellular telephone bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, etc.), near-field communications (NFC) transceiver circuitry that handles near-field communications bands (e.g., at 13.56 MHz), satellite navigation receiver circuitry that handles satellite navigation bands (e.g., a GPS band from 1565 to 1610 MHz, a Global Navigation Satellite System (GLONASS) band, a BeiDou Navigation Satellite System (BDS) band, etc.), ultra-wideband (UWB) transceiver circuitry that handles communications using the IEEE 802.15.4 protocol and/or other ultra-wideband communications protocols, and/or any other desired radio-frequency transceiver circuitry for covering any other desired communications bands of interest.

Wireless circuitry 24 may include one or more antennas such as antenna 42. Antenna 42 may be formed using any desired antenna structures. For example, antenna 42 may be an antenna with a resonating element that is formed from loop antenna structures, patch antenna structures, inverted-F antenna structures, slot antenna structures, planar inverted-F antenna structures, helical antenna structures, monopole antennas, dipoles, hybrids of these designs, etc. Two or more antennas 42 may be arranged into one or more phased antenna arrays (e.g., for conveying radio-frequency signals at millimeter wave frequencies). Parasitic elements may be included in antenna 42 to adjust antenna performance. Antenna 42 may be provided with a conductive cavity that backs the antenna resonating element of antenna 42 (e.g., antenna 42 may be a cavity-backed antenna such as a cavity-backed slot antenna).

As described above, front end module 40 may include one or more power amplifiers (PA) circuits 50 in the transmit (uplink) path. A power amplifier 50 (sometimes referred to as radio-frequency power amplifier circuitry, transmit amplifier circuitry, or amplifier circuitry) may be configured to amplify a radio-frequency signal without changing the signal shape, format, or modulation. Power amplifier 50 may, for example, be used to provide 10 dB of gain, 20 dB of gain, 10-20 dB of gain, less than 20 dB of gain, more than 20 dB of gain, or other suitable amounts of gain.

Figure 3:
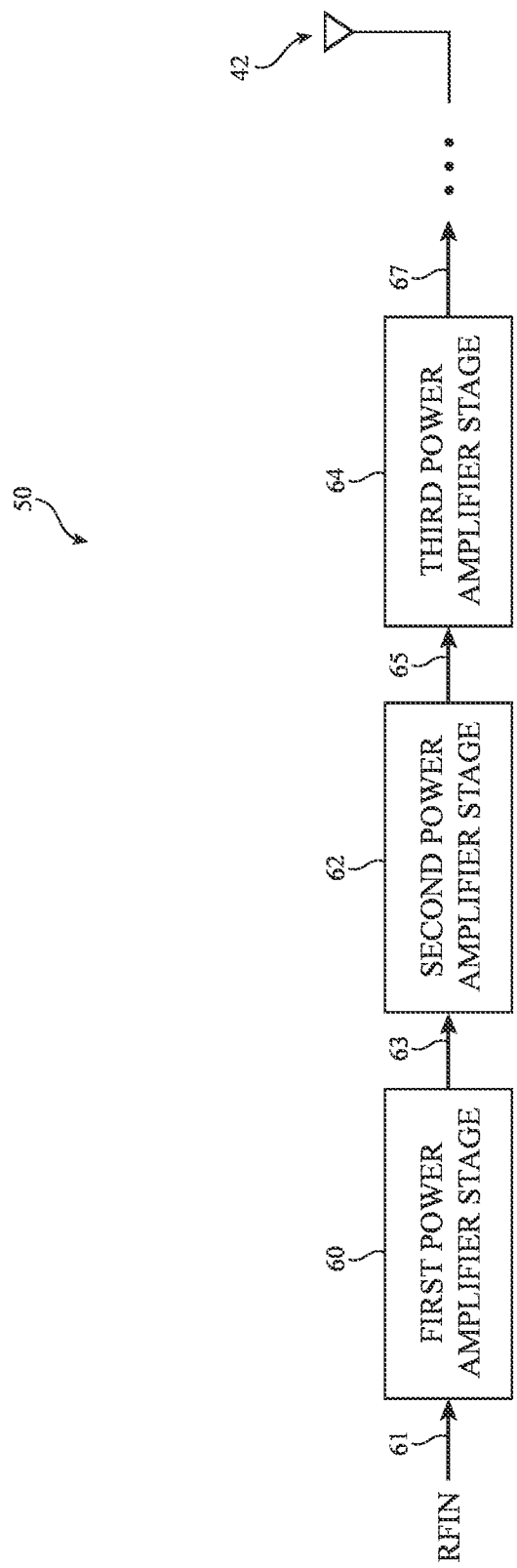
FIG. 3 is a diagram of illustrative power amplifier circuitry having multiple stages in accordance with some embodiments.

In some illustrative configurations described herein as an example, power amplifier 50 may include multiple stages. FIG. 3 is a block diagram of illustrative power amplifier circuitry containing three stages. As shown in FIG. 3, power amplifier 50 may include a first power amplifier stage such as stage 60 that receives a radio-frequency input signal on path 61 and generates a corresponding amplified radio-frequency signal on path 63. Power amplifier 50 may include a second power amplifier stage such as stage 62 that receives the radio-frequency signal amplified by stage 60 and generate a corresponding (further) amplified radio-frequency signal on path 65. Power amplifier 50 may include a third power amplifier stage such as stage 64 that receives the radio-frequency signal amplified by stage 62 and generate a corresponding (further) amplifier radio-frequency signal on path 67. The final amplified radio-frequency signal on path 67 may ultimately be conveyed to one or more antennas 42 (e.g., one or more antenna resonating elements) for transmission via the one or more antennas 42.

Each of amplifier stages 60, 62, and 64 may be formed from any suitable type of power amplifier circuitry. As examples, each of these power amplifier stages may be a common-source amplifier stage, may be a common-gate amplifier stage, may be a cascode amplifier stage, or may be another type of amplifier stage. Power amplifier 50 may include any suitable number of amplifier stages (e.g., two stages, three stages, more than four stages, etc.) coupled in series. The order and type of amplifier stages provide in power amplifier 50 may meet or exceed one or more power amplifier operating parameters, e.g., relating to amplifier gain, linearity or noise, power consumption, etc. Different amplifier stages may be implemented on the same integrated circuit and/or may be implemented separately using multiple integrated circuit coupled to each other. As an example, stages 60 and 62 may be implemented on an integrated circuit forming part of front end module 40, while stage 64 may be implemented outside of the integrated circuit (e.g., on a different integrated circuit).

It can be challenging to design a satisfactory radio-frequency power amplifier for an electronic device. Power losses may be incurred along the transmit path (e.g., by impedance matching circuitry between amplifier stages, between the power amplifier and a preceding stage, between the power amplifier and a succeeding stage, etc.). To make up for the power losses while achieving certain amplifier gain parameters, the power amplifier may draw additional power, thereby undesirably increasing power consumption.

As an example, intervening impedance matching circuitry may be provided between each pair of stages such as between stages 60 and 62, between stages 62 and 64, and/or between stage 60 and a preceding stage in front end module 40. The intervening impedance matching circuitry may cause the above-mentioned power losses and corresponding increase in power consumption (e.g., in order to achieve the same amplifier gain).

Figure 4:
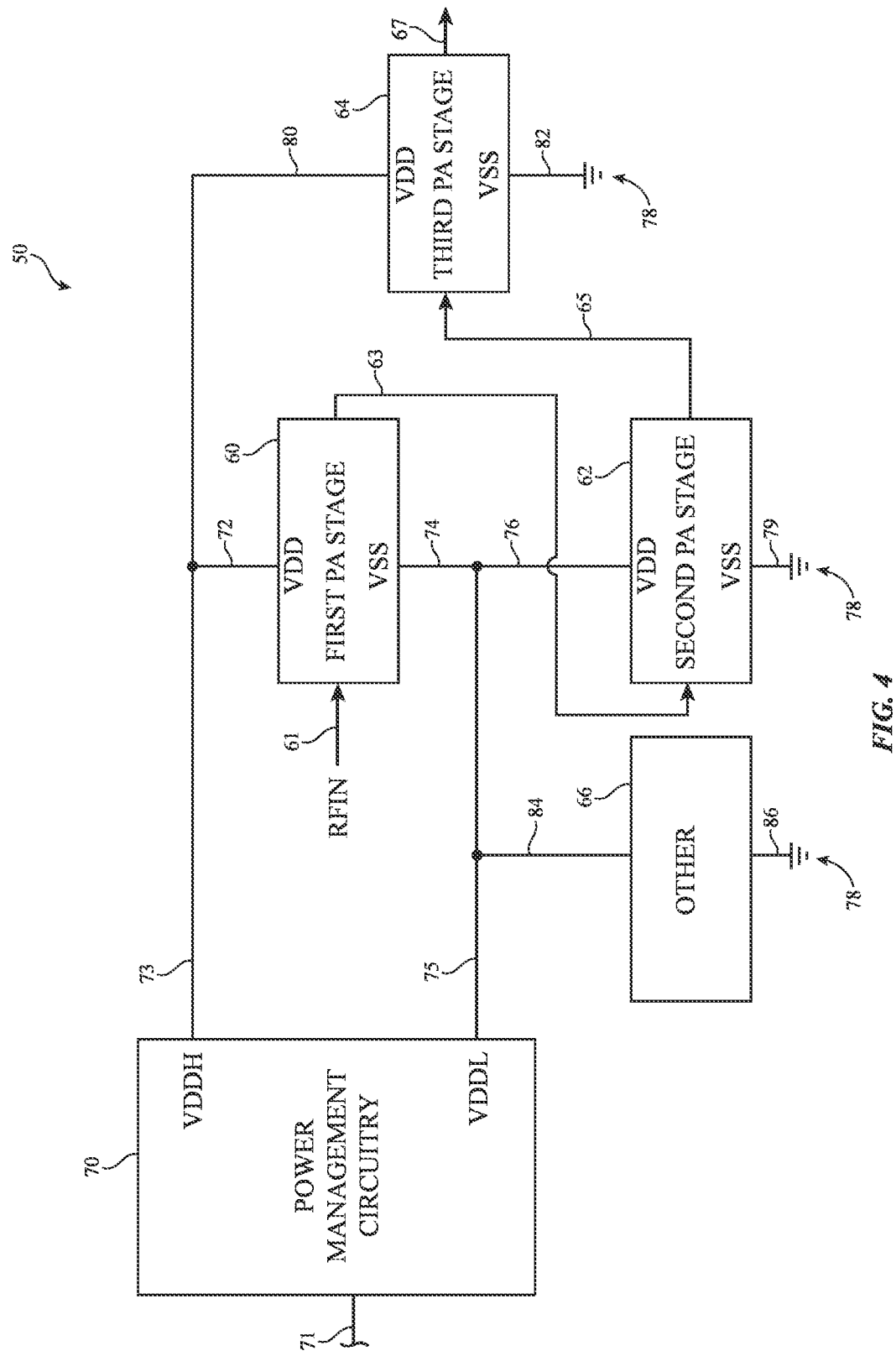
FIG. 4 is a diagram of illustrative power amplifier circuitry having first and second stages in a current reuse scheme in accordance with some embodiments.

It may be desirable to provide a power amplifier such as power amplifier 50 with a configuration that reduces power consumption, e.g., by using a more efficiently generated power supply voltage for powering one or more amplifier stages and/or by using a current reuse scheme. FIG. 4 is a block diagram of illustrative amplifier circuitry with reduced power consumption characteristics.

As shown in FIG. 4, stages 60, 62, and 64 in power amplifier 50 may operate in different voltage domains. In particular, device 10 may include power management circuitry 70. Power management circuitry 70 may include one or more power management integrated circuits each containing one or more voltage regulators (e.g., containing DC-to-DC voltage converters), and other circuits for providing power supply voltages to components in device 10.

Power management circuitry 70 may receive an input voltage at an input path 71. The input voltage may be a voltage supplied by a battery or other voltage sources. Based on this input voltage, power management circuitry 70 may supply a first positive power supply voltage VDDH on power supply line 73 and a second positive power supply voltage VDDL on power supply line 75. These power supply lines may sometimes be referred to as power supply rails or power supply terminals.

Positive power supply voltage VDDL may be at a voltage level that is larger than a ground voltage level (e.g., a ground power supply voltage supplied by a ground power supply line or a ground power supply terminal). Positive power supply voltage VDDH may be at a voltage level that is larger than the voltage level of power supply voltage VDDL. In particular, it may be desirable to provide voltage VDDH at a voltage level that is less than twice the voltage level of voltage VDDL (e.g., to provide different amplifier stages with different pairs of power supply voltage levels). As one illustrative example, the input voltage provided on input path 71 may be at 3.6 V, positive power supply voltage VDDH may be at 1.8 V, power supply voltage VDDL may be at 1 V, and the ground power supply voltage may be at 0 V. If desired, other voltage levels may be provided.

In one illustrative arrangement, a first voltage regulator in power management circuitry 70 may generate voltage VDDH based on the input voltage, while a second voltage regulator in power management circuitry 70 may generate voltage VDDL based on the input voltage. The first voltage regulator may be more efficient at generating voltage VDDH than the second voltage regulator is at generating voltage VDDL (e.g., less power loss is associated with the process of generating voltage VDDH than with the process of generating voltage VDDL due to voltage VDDH being closer to the input voltage). Accordingly, it may be desirable to use the more efficiently-generated voltage VDDH to supply power (e.g., to some power amplifier stages such as stages 60 and 64 in power amplifier 50). Voltage VDDL, although less efficiently generated, may be a standardized voltage suitable to supply power to standardized components.

In the example of FIG. 4, first power amplifier stage 60 may receive voltage VDDH on line 73 via path 72 at a first power (voltage) supply terminal and may receive voltage VDDL on line 75 via path 74 at a second power (voltage) supply terminal. Components such as transistors within amplifier stage 60 may operate between a high voltage VDD and a low voltage VSS (e.g., one or more of the source, drain, and gate terminals of each transistor may receive one of the high voltage VDD and the low voltage VSS, the amplifier stage as a whole may produce an operating current based on a difference between the high voltage VDD and the low voltage VSS, etc.). For amplifier stage 60, power supply voltage VDDH may be received as the high voltage VDD of operation, while power supply voltage VDDL may be received as the low voltage VSS of operation. In particular, amplifier stage 60, using a current provided by a voltage difference between power supply voltages VDDH and VDDL, may perform its amplification of the input radio-frequency signal on path 61 to generate an amplified radio-frequency signal on path 63.

Second power amplifier stage 62 may receive voltage VDDL on line 75 via path 76 at a first power (voltage) supply terminal and may receive the ground power supply voltage via path 79 coupled to ground voltage input terminal 78 at a second power (voltage) supply terminal. Components such as transistors within amplifier stage 62 may operate between a high voltage VDD and a low voltage VSS (e.g., one or more of the source, drain, and gate terminals of each transistor may receive one of the high voltage VDD and the low voltage VSS, the amplifier stage as a whole may produce an operating current based on a difference between the high voltage VDD and the low voltage VSS, etc.). For amplifier stage 62, power supply voltage VDDL may be received as the high voltage VDD of operation, while the ground power supply voltage may be received as the low voltage VSS of operation. In particular, amplifier stage 62, using a current provided by a voltage difference between power supply voltage VDDL and the ground power supply voltage, may perform its amplification of the input radio-frequency signal on path 63 to generate an amplified radio-frequency signal on path 65.

Third power amplifier stage 64 may receive voltage VDDH on line 73 via path 80 at a first power (voltage) supply terminal and may receive the ground power supply voltage via path 82 coupled to ground voltage input terminal 78 at a second power (voltage) supply terminal. Components such as transistors within amplifier stage 64 may operate between a high voltage VDD and a low voltage VSS (e.g., one or more of the source, drain, and gate terminals of each transistor may receive one of the high voltage VDD and the low voltage VSS, the amplifier stage as a whole may produce an operating current based on a difference between the high voltage VDD and the low voltage VSS, etc.). For amplifier stage 64, power supply voltage VDDH may be received as the high voltage VDD of operation, while the ground power supply voltage may be received as the low voltage VSS of operation. In particular, amplifier stage 64, using a current produced based on a voltage difference between power supply voltage VDDH and the ground power supply voltage, may perform its amplification of the input radio-frequency signal on path 65 to generate an amplified radio-frequency signal on path 67 (e.g., to be received at antenna(s) 42 and transmitted by antenna(s) 42).

In other words, stage 60 may have a radio-frequency input (e.g., a port or terminal) and a radio-frequency output (e.g., port or terminal), stage 62 may have a radio-frequency input (e.g., port or terminal) and a radio-frequency output (e.g., port or terminal), and stage 64 may have a radio-frequency input (e.g., port or terminal) and a radio-frequency output (e.g., port or terminal). The output of stage 60 may be coupled to the input of stage 62. The output stage 62 may be coupled to the input of stage 64. As such, stage 62 may be coupled between stage 60 and stage 64.

In some illustrative arrangements, to operate in a voltage domain defined by power supply voltage VDDH and the ground power supply voltage, power amplifier stage 64 may include stacked transistors (e.g., a series-connected set of transistors having a shared or common bulk terminal).

Each of these power amplifier stages 60, 62, and 64 may be a common-source amplifier stage, may be a common-gate amplifier stage, may be a cascode amplifier stage, or may be another type of amplifier stage. Configurations in which amplifier stages 60 and 62 are common-source amplifier stages and amplifier stage 64 is a cascode amplifier stage are sometimes described herein as an illustrative example.

Other components or stages 66 in amplifier circuitry 50 and/or in front end module 40 may operate based on power supply voltage VDDL. In particular, these other components may receive voltage VDDL on line 75 via path 84 and may receive the ground power supply voltage via path 86 coupled to ground voltage input terminal 78. As described above, voltage VDDL may be at a standardized voltage level (e.g., 1 V), and accordingly, many components may be configured (e.g., specified or designed) to operate using this standardized voltage level. The operation of amplifier stages 60, 62, and 64 may use one or more other voltage domains to provide the desirable characteristics to power amplifier 50 such as current reuse, higher gain characteristics, higher linearity characteristics, lower power consumption characteristics, etc.

Configured in the manner shown in FIG. 4, stage 60 may perform current sharing or current reuse with stage 62, thereby further reducing power consumption within power amplifier 50. In particular, a current flowing through a path in stage 60 may subsequently flow through a path in stage 62. The path in stage 60 is coupled in series with the path in stage 62. Multiple such current reuse paths (coupled in parallel) may exist across stages 60 and 62.

The demands or desired characteristics of stages 60 and 62 may differ because stage 60 performs the initial amplification and therefore amplifies a smaller signal (e.g., a signal with amplitudes smaller in magnitude) while stage 62 perform further amplification and therefore amplifies a larger (already-previously amplified) signal (e.g., a signal with amplitudes larger in magnitude). To process the larger signal, stage 62 may need to operate with a higher operating current. This operating current may be provided by the connection to the power supply voltage line supplying voltage VDDL (e.g., path 76 to power supply voltage line 75). By providing this connection, e.g., path 76 to power supply voltage line 75, stage 62 may draw any additional current as needed during signal amplification. The condition that the voltage level of VDDH is less than twice the voltage level of VDDL (e.g., as noted in paragraph [0047]) gives rise to a configuration where the voltage developed between voltage VDD and voltage VSS of stage 60 is less than the voltage developed between voltage VDD and voltage VSS of stage 62.

Additionally, stage 60 may be configured to operate by focusing on meeting or exceeding amplifier gain parameters (e.g., to exhibit higher gain than stage 62), while stage 62 may be configured to operate by focusing on meeting or exceeding amplifier linearity parameters (e.g., to exhibit higher linearity than stage 60). Accordingly, a voltage difference between voltages VDD and VSS for stage 60 (sometimes referred to as the headroom for stage 60) may be less than a voltage difference between voltages VDD and VSS for stage 62 (sometimes referred to as the headroom for stage 62). As one illustrative example, the voltage difference between voltages VDD and VSS for stage 60 (e.g., the voltage difference between voltages VDDH and VDDL) may be 0.8 V, while the voltage difference between voltages VDD and VSS for stage 62 (e.g., the voltage difference between voltages VDDL and the ground power supply voltage) may be 1 V.

Figure 5:
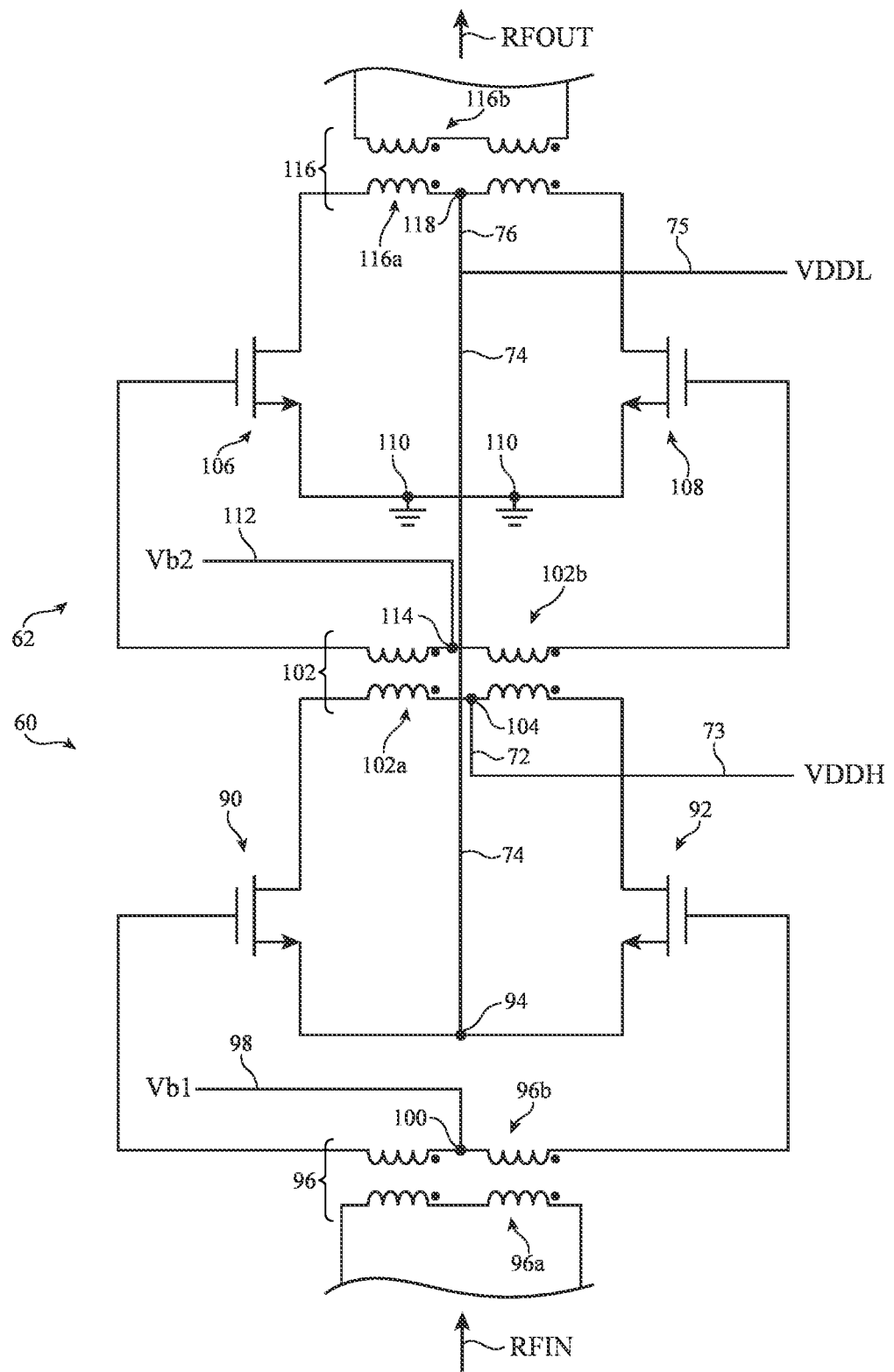
FIG. 5 is a circuit diagram of illustrative power amplifier circuitry having two common-source amplifier stages in accordance with some embodiments.

FIG. 5 is a circuit diagram showing one illustrative implementation of amplifier stages 60 and 62 in amplifier circuitry 50. In the example of FIG. 5, amplifier stage 60 and amplifier stage 62 may both be common-source amplifier stages.

Since first PA stage 60 operates from DC bias voltages above those of the following second PA stage 62, the circuit element that couples the first PA stage to the second PA stage should provide DC isolation. In this exemplary realization, the DC isolation may be provided by the interstage transformer 102 but could also be realized by other well-known techniques such as DC blocking capacitors.

As shown in FIG. 5, amplifier stage 60 may include transistors 90 and 92. Transistors 90 and 92 may both be n-type (n-channel) transistors such as n-type metal-oxide-semiconductor (NMOS) devices. Transistor 90 may have a source terminal, a gate terminal and a drain terminal. The source terminal of transistor 90 may be coupled to a source terminal of transistor 92. The common source terminals of transistors 90 and 92 (connected at common terminal 94) may be connected to a power supply voltage line 75 via path 74. Power supply voltage line 75 may be configured to provide positive power supply voltage VDDL. The gate terminal of transistor 90 may be coupled to an input transformer 96. The drain terminal of transistor 90 may be coupled to an inter-stage transformer 102. The terms "source" and "drain" terminals used to refer to current-conveying terminals in a transistor may be used interchangeably and are sometimes referred to as "source-drain" terminals. Thus, the source terminal of transistor 90 can sometimes be referred to as a first source-drain terminal, and the drain terminal of transistor 90 can be referred to as a second source-drain terminal (or vice versa).

Transistor 92 may have a source terminal, a gate terminal, and a drain terminal. The source terminal of transistor 92 may be coupled to the source terminal of transistor 90 (e.g., at common terminal 94). The gate terminal of transistor 92 may be coupled to transformer 96. The drain terminal of transistor 92 may be coupled to inter-stage transformer 102.

The gate terminals of transistors 90 and 92 may be coupled to a radio-frequency signal input port (e.g., a different input port having positive and negative terminals) via input transformer 96. Transformer 96 may include a primary winding (inductor coil) 96a having a first terminal coupled to the negative terminal of the differential input port and a second terminal coupled to the positive terminal of the differential input port. Transformer 96 may also include a secondary winding (inductor coil) 96b having a first terminal coupled to the gate terminal of transistor 90, a second terminal coupled to the gate terminal of transistor 92, and a center tap (terminal) 100 coupled to a bias voltage line 98 configured to provide center tap 100 with a bias voltage Vb1. Center tap 100 of secondary winding 96b may also be coupled to stage 62 (via center tap 118 of winding 116a).

While transformer 96 is sometimes described herein as an "input" transformer, this simply refers to stage 60 receiving an input radio-frequency signal for that stage through transformer 96. In fact, transformer 96 may also be an "inter-stage" transformer between stage 60 and a preceding stage that provides the input radio-frequency signal to stage 60.

The drain terminals of transistors 90 and 92 may be coupled to a succeeding or downstream stage such as stage 62 via inter-stage input transformer 102. Transformer 102 may include a primary winding (inductor coil) 102a having a first terminal coupled to the drain terminal of transistor 90, a second terminal coupled to the drain terminal of transistor 92, and a center tap (terminal) 104 coupled, via path 72, to power supply voltage line 73 configured to provide center tap 104 with positive power supply voltage VDDH. Transformer 102 may also include a secondary winding (inductor coil) 102b coupled to stage 62.

Amplifier stage 62 may include transistors 106 and 108. Transistors 106 and 108 may both be n-type (n-channel) transistors such as n-type metal-oxide-semiconductor (NMOS) devices. Transistor 106 may have a source terminal, a gate terminal and a drain terminal. The source terminal of transistor 106 may be coupled to a source terminal of transistor 108. The common source terminals 110 of transistors 90 and 92 may be connected to one or more ground power supply lines (e.g., one or more ground lines or terminals 78 in FIG. 4 on which the ground power supply voltage is provided). The gate terminal of transistor 106 may be coupled to transformer 102. The drain terminal of transistor 106 may be coupled to an output transformer 116.

Transistor 108 may have a source terminal, a gate terminal, and a drain terminal. The source terminal of transistor 108 may be coupled to the source terminal of transistor 106. The gate terminal of transistor 108 may be coupled to transformer 102. The drain terminal of transistor 92 may be coupled to transformer 116.

The gate terminals of transistors 106 and 108 may be coupled to amplifier stage 60 via transformer 102. Transformer 102 may include a primary winding (inductor coil) 102a coupled to amplifier stage 60. Transformer 102 may also include a secondary winding (inductor coil) 102b having a first terminal coupled to the gate terminal of transistor 106, a second terminal coupled to the gate terminal of transistor 108, and a center tap (terminal) 114 coupled to a bias voltage line 112 configured to provide center tap 114 with a bias voltage Vb2.

The drain terminals of transistors 106 and 108 may be coupled to a succeeding or downstream stage such as stage 64 (FIG. 4) via output transformer 116. Transformer 116 may include a primary winding (inductor coil) 116a having a first terminal coupled to the drain terminal of transistor 106, a second terminal coupled to the drain terminal of transistor 108, and a center tap (terminal) 118 coupled, via path 76, to power supply voltage line 75 configured to provide center tap 118 with positive power supply voltage VDDL. Transformer 116 may also include a secondary winding (inductor coil) 116 coupled to a downstream stage in the transmit path. In particular, the drain terminals of transistor 106 and 108 may be coupled to a radio-frequency output port (for stage 62) via transformer 116.

While transformer 116 is sometimes described herein as an "output" transformer, this simply refers to stage 62 outputting an output radio-frequency signal for that stage through transformer 116. In fact, transformer 116 may also be an "inter-stage" transformer between stage 62 and a succeeding stage such as stage 64.

During the amplification operation of stage 60, a current may flow from center tap 104 (supplied with voltage VDDH) across source-drain terminals of transistors 90 and 92 (along the two parallel paths) to common source terminal 94. The common source terminal 94 may further may be connected to center tap 118 in stage 62. As such, the current from stage 60 may flow through paths 74 and 76 to stage 62. During amplification operation of stage 62, the current from stage 60 may further flow from center tap 118 across source-drain terminals of transistors 106 and 108 (along the two parallel paths) to their common source terminal (e.g., terminal 110) coupled to a ground power supply line. Configured in this manner, amplifier stages 60 and 62 may implement a current reuse configuration for amplifier circuitry 50.

Because amplifier stage 62 is downstream from amplifier stage 60, amplifier stage 60 may have higher current consumption requirements (e.g., may require a higher supply current). The current from stage 60 to be shared at stage 62 may be insufficient to meet these higher current consumption requirements. As such, a power supply connection to stage 62 (e.g., at center tap 118) may be provided via path 76 to power supply voltage line 75 supplying voltage VDDL. This power supply connection may supply any supplemental current needed to properly perform the amplification operations of amplifier stage 62. Accordingly, this power supply connection may sometimes be referred to as a supplemental current supply path.

As described in connection with FIG. 4, the voltage difference across amplifier stage 60 (e.g., across transistors 90 and 92) may be less than the voltage difference across amplifier stage 62 (e.g., across transistors 90 and 92). This may enable amplifier stage 60 to exhibit desirable (e.g., greater) gain characteristics while enabling amplifier stage 62 to exhibit desirable (e.g., higher) linearity characteristics.

While not explicitly shown in FIG. 5 in order not to obscure the embodiments described above in connection with FIG. 5, stages 60 and 62 may include input and/or output impedance matching components (e.g., capacitors, resistors, and/or inductors coupled in series and/or shunt configurations) across one or more windings of transformers 96, 102, and/or 116. As examples, a capacitor may have a first terminal coupled to the first terminal of primary winding 102a and a second terminal coupled to the second terminal of primary winding 102a, a capacitor may have a first terminal coupled to the first terminal of primary winding 116a and a second terminal coupled to the second terminal of primary winding 116a, etc. In some illustrative configurations described herein as an example, the impedance matching circuitry between stage 60 and stage 62 may implement conjugate matching to improve amplifier gain and the impedance matching circuitry between stage 62 and stage 64 may implement load pull matching to improve amplifier linearity.

The embodiments of FIG. 5 in which amplifier stages 60 and 62 are both implemented using common-source amplifier stages are illustrative of one of many other possible implementations. As additional examples, FIGS. 6-8 illustrate embodiments in which amplifier stages 60 and 62 are implemented using combinations of other types of amplifier stages.

Figure 6:
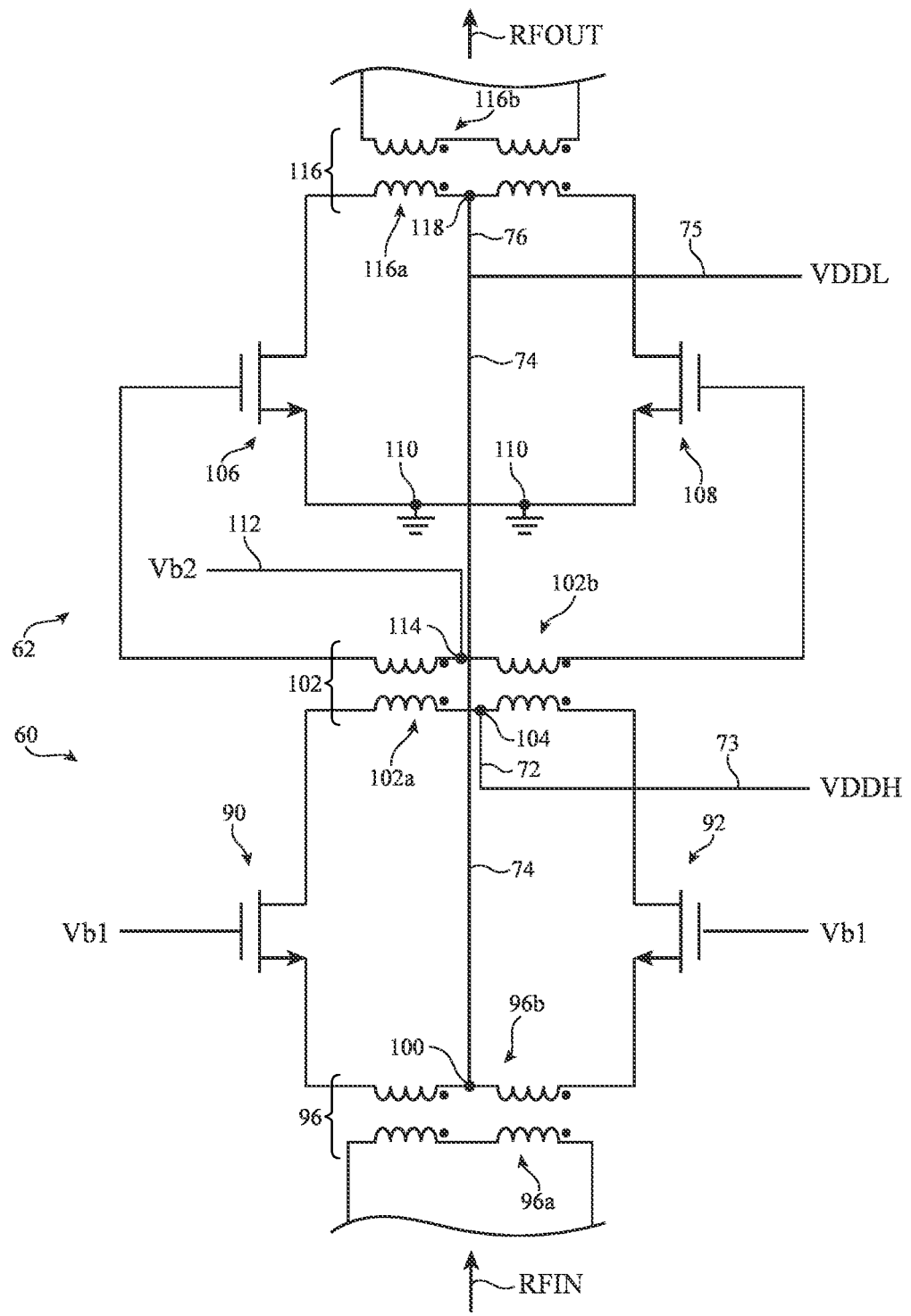
FIG. 6 is a circuit diagram of illustrative power amplifier circuitry having a common-gate amplifier stage preceding a common-source amplifier stage in accordance with some embodiments.

As a first additional example, FIG. 6 illustrates amplifier circuitry 50 having an amplifier stage 60 implemented as a common-gate amplifier stage while amplifier stage 62 remains a common-source amplifier stage. The structure and function of amplifier stage 62 and some portions of amplifier stage 60 (and some inter-stage elements) are similar to those already described in connection with FIG. 5 and need not be reiterated in detail to avoid obscuring the present embodiments in connection with FIG. 6.

As shown in FIG. 6, amplifier stage 60 may still include n-type transistors 90 and 92. In contrast with FIG. 5, the gate terminal of transistor 90 and the gate terminal of transistor 92 in FIG. 6 may be configured to receive a same bias voltage Vb1 (e.g., at a common gate terminal coupled to both transistors 90 and 92 and coupled to a shared bias voltage line supplying voltage Vb1). In contrast with FIG. 5, the source terminal of transistor 90 and the source terminal of transistor 92 in FIG. 6 may be coupled to the first terminal of secondary winding 96b and the second terminal of secondary winding 96b, respectively. Center tap (terminal) 100 of secondary winding 96b may be coupled to stage 62 via center tap (terminal) 118 of winding 116a (via paths 74 and 76) and may be coupled to power supply voltage line 75 supplying voltage VDDL (via path 74).

Figure 7:
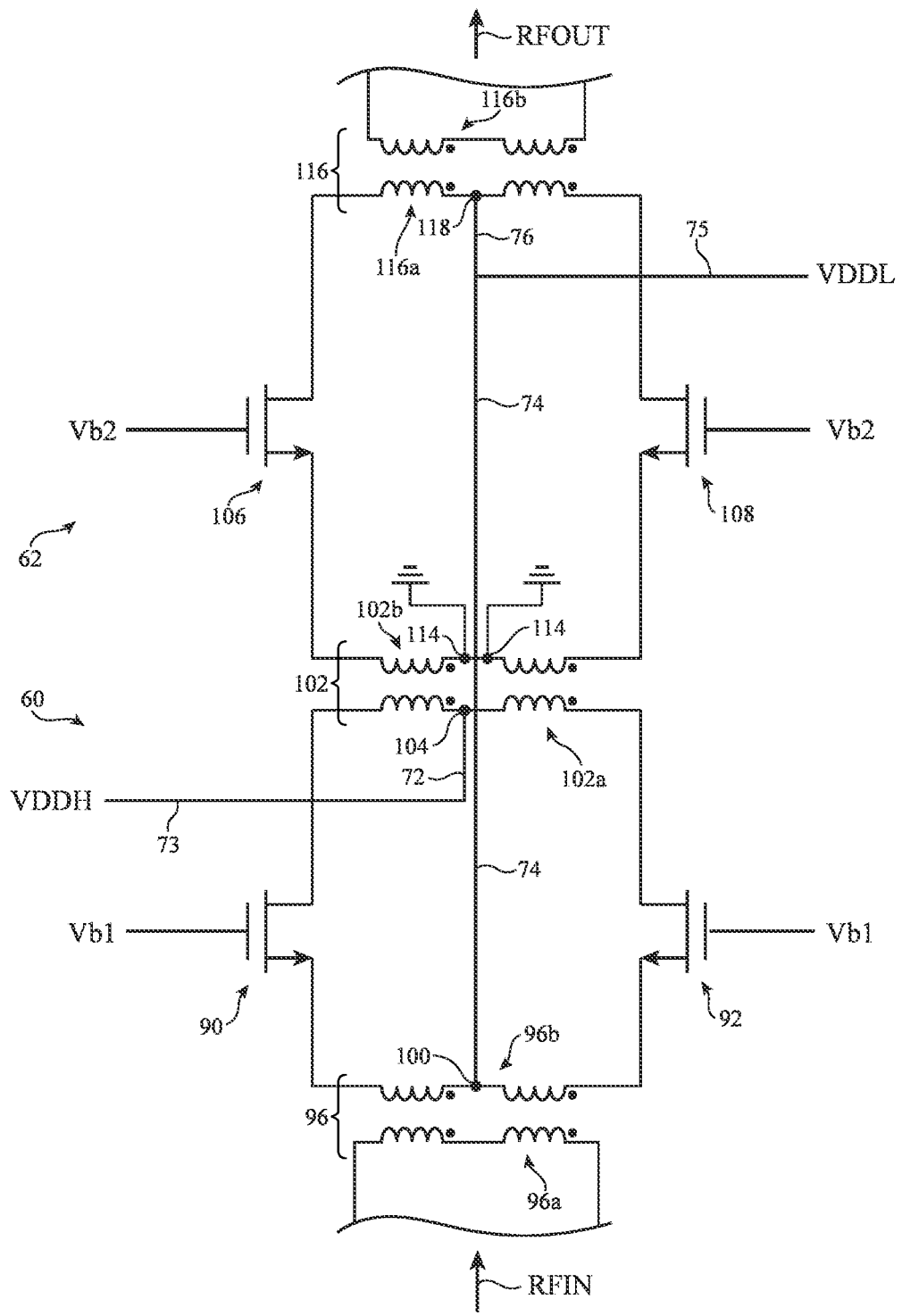
FIG. 7 is a circuit diagram of illustrative power amplifier circuitry having two common-gate amplifier stages in accordance with some embodiments.
Figure 8:
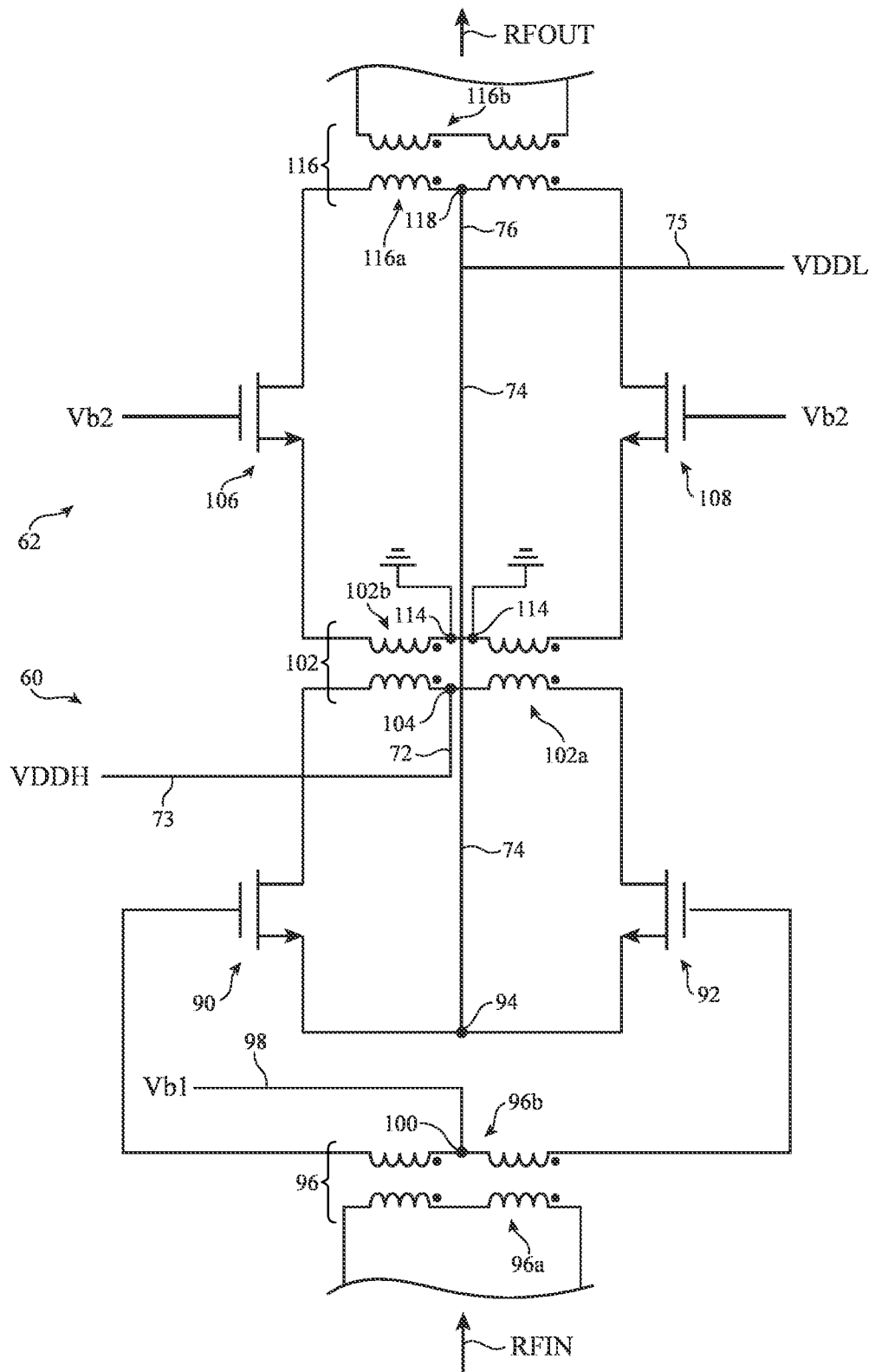
FIG. 8 is a circuit diagram of illustrative power amplifier circuitry having a common-source amplifier stage preceding a common-gate amplifier stage in accordance with some embodiments.

As a second additional example, FIG. 7 illustrates amplifier circuitry 50 having an amplifier stage 60 and an amplifier stage 62 both implemented as common-gate amplifier stages. The structure and function of some portions of amplifier stages 60 and 62 (and some inter-stage elements) are similar to those already described in connection with FIGS. 5 and 6 and need not be reiterated in detail to avoid obscuring the present embodiments in connection with FIG. 7.

As shown in FIG. 7, amplifier stage 60 may still include n-type transistors 90 and 92. The gate terminal of transistor 90 and the gate terminal of transistor 92 in FIG. 7 may be configured to receive a same bias voltage Vb1 (e.g., at a common gate terminal coupled to both transistors 90 and 92 and coupled to a shared bias voltage line supplying voltage Vb1). The source terminal of transistor 90 and the source terminal of transistor 92 in FIG. 7 may be coupled to the first terminal of secondary winding 96b and the second terminal of secondary winding 96b, respectively. Center tap (terminal) 100 of secondary winding 96b may be coupled to stage 62 via center tap (terminal) 118 of winding 116a (via paths 74 and 76) and may be coupled to power supply voltage line 75 supplying voltage VDDL (via path 74).

As shown in FIG. 7, amplifier stage 62 may still include n-type transistors 106 and 108. The gate terminal of transistor 106 and the gate terminal of transistor 108 in FIG. 7 may be configured to receive a same bias voltage Vb2 (e.g., at a common gate terminal coupled to both transistors 90 and 92 and coupled to a shared bias voltage line supplying voltage Vb2). The source terminal of transistor 106 and the source terminal of transistor 108 in FIG. 7 may be coupled to the first terminal of secondary winding 102b and the second terminal of secondary winding 102b, respectively. One or more center tap (terminals) 114 of secondary winding 102b may be coupled to one or more ground power supply voltage lines or terminals (e.g., terminals 78 in FIG. 4) supplying the ground power supply voltage.

As a third additional example, FIG. 8 illustrates amplifier circuitry 50 having an amplifier stage 62 implemented as a common-gate amplifier stage while amplifier stage 60 remains a common-source amplifier stage (in comparison with FIG. 5). The structure and function of amplifier stage 60 and some portions of amplifier stage 62 (and some inter-stage elements) are similar to those already described in connection with FIG. 5 and need not be reiterated in detail to avoid obscuring the present embodiments in connection with FIG. 8.

As shown in FIG. 8, amplifier stage 62 may still include n-type transistors 106 and 108. In contrast with FIG. 5, the gate terminal of transistor 106 and the gate terminal of transistor 108 in FIG. 8 may be configured to receive a same bias voltage Vb2 (e.g., at a common gate terminal coupled to both transistors 106 and 108 and coupled to a shared bias voltage line supplying voltage Vb2). In contrast with FIG. 5, the source terminal of transistor 106 and the source terminal of transistor 108 in FIG. 8 may be coupled to the first terminal of secondary winding 102b and the second terminal of secondary winding 102b, respectively. One or more center tap (terminals) 114 of secondary winding 102b may be coupled to one or more ground power supply voltage lines or terminals (e.g., terminals 78 in FIG. 4) supplying the ground power supply voltage.

Figure 9:
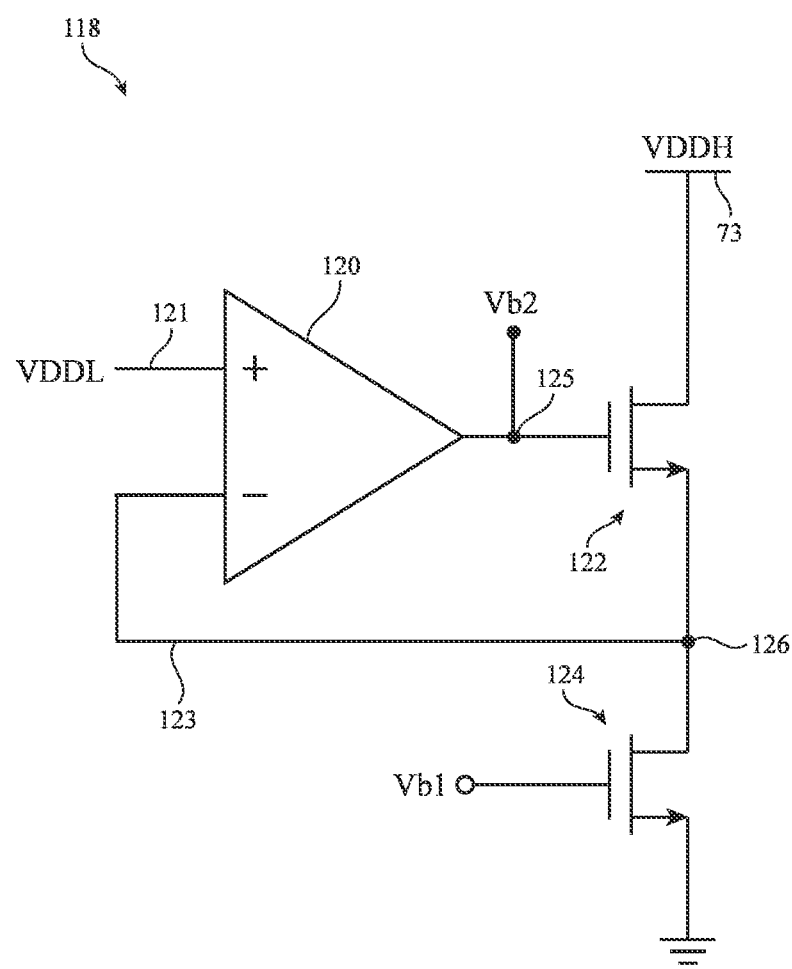
FIG. 9 is a circuit diagram of illustrative bias voltage generation circuitry in accordance with some embodiments.

Bias voltage Vb2 (e.g., for stage 62 in any of FIGS. 5-8) may be generated using bias voltage generation circuitry 118 (sometimes referred to as bias voltage generator 118) of the type shown in FIG. 9. As shown in FIG. 9, bias voltage generator 118 may include an operational amplifier 120, transistor 122 and transistor 124. Transistors 122 and 124 may both be n-type transistors. Transistor 122 may be connected in series with transistor 124 between a positive power supply voltage terminal 73 providing voltage VDDH and a ground power supply voltage terminal providing the ground power supply voltage. In particular, the drain terminal of transistor 122 may be coupled to power supply voltage terminal 73. The source terminal of transistor 124 may be coupled to the ground power supply voltage terminal. The source terminal of transistor 122 may be coupled to the drain terminal of transistor 124 at a common terminal 126.

Operational amplifier 120 may have a positive (+) input terminal configured to receive a positive power supply voltage VDDL along path 121 (e.g., by connecting to a power supply voltage line supply voltage VDDL), a negative (−) input terminal coupled to common terminal 126 between transistors 122 and 124 (via path 123), and an output terminal 125 coupled to the gate terminal of transistor 122. The gate terminal of transistor 124 may be configured to receive a bias voltage Vb1 (e.g., by connecting to a bias voltage line). Bias voltage Vb2 may be generated at output terminal 125 of operational amplifier 94 based on bias voltage Vb1 provided as input.

Bias voltage generator 118 of the type shown in FIG. 9 is merely illustrative. If desired, other types of bias voltage generator or regulator can be used to output bias voltage Vb2.

The methods and operations described above in connection with FIGS. 1-9 may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., storage circuitry 16 and/or wireless communications circuitry 24 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., processing circuitry in wireless circuitry 24, processing circuitry 18 of FIG. 1, etc.). The processing circuitry may include microprocessors, application processors, digital signal processors, central processing units (CPUs), application-specific integrated circuits with processing circuitry, or other processing circuitry.

The foregoing is merely illustrative and various modifications can be made to the described embodiments. The foregoing embodiments may be implemented individually or in any combination.

What is claimed is:

1. A radio-frequency power amplifier comprising:
    a first amplifier stage having power supply terminals configured to receive a first voltage and a second voltage less than the first voltage, the first amplifier stage being configured to output a first radio-frequency signal;
    a second amplifier stage having power supply terminals configured to receive the second voltage and a third voltage less than the second voltage, the second amplifier stage being configured to receive the first radio-frequency signal and output a second radio-frequency signal by amplifying the first radio-frequency signal; and
    a third amplifier stage having power supply terminals configured to receive the first voltage and the third voltage, the second amplifier stage being coupled between the first amplifier stage and the third amplifier stage.

2. The radio-frequency power amplifier of claim 1 further comprising:
    an input transformer coupled to the first amplifier stage;
    an inter-stage transformer coupled between the first amplifier stage and the second amplifier stage; and
    an output transformer coupled to the second amplifier stage.

3. The radio-frequency power amplifier of claim 2, wherein
    the first amplifier stage comprises a first transistor and a second transistor, each having a first terminal configured to receive a third radio-frequency signal and a second terminal configured to generate the first radio-frequency signal, the first terminal of the first transistor being coupled to the first terminal of the second transistor and coupled to the input transformer and the second terminal of the first transistor being coupled to the second terminal of the first transistor and coupled to the inter-stage transformer, and
    the second amplifier stage comprises a third transistor and a fourth transistor, each having a first terminal configured to receive the first radio-frequency signal and a second terminal configured to generate the second radio-frequency signal, the first terminal of the third transistor being coupled to the first terminal of the fourth transistor and coupled to the inter-stage transformer and the second terminal of the third transistor being coupled to the second terminal of the fourth transistor and coupled to the output transformer.

4. The radio-frequency power amplifier of claim 3, wherein the first terminal of the first transistor and the first terminal of the second transistor are gate terminals, the input transformer comprises a secondary winding with a center tap terminal configured to receive a first bias voltage, the second terminal of the first transistor and the second terminal of the second transistor are drain terminals, the inter-stage transformer has a primary winding with a center tap terminal configured to receive the first voltage, and the first transistor and the second transistor have a common source terminal configured to receive the second voltage via a power supply line.

5. The radio-frequency power amplifier of claim 4, wherein the first terminal of the fourth transistor and the first terminal of the third transistor are gate terminals, the inter-stage transformer comprises a secondary winding with a center tap terminal configured to receive a second bias voltage, the second terminal of the third transistor and the second terminal of the fourth transistor are drain terminals, the output transformer has a primary winding with a center tap terminal configured to receive the second voltage via the power supply line, and the third transistor and the fourth transistor have a common source terminal configured to receive the third voltage.

6. The radio-frequency power amplifier of claim 4, wherein the first terminal of the fourth transistor and the first terminal of the third transistor are source terminals, the inter-stage transformer comprises a secondary winding with a center tap terminal configured to receive the third voltage, the second terminal of the third transistor and the second terminal of the fourth transistor are drain terminals, the output transformer has a primary winding with a center tap terminal configured to receive the second voltage via the power supply line, and the third transistor and the fourth transistor have a common gate terminal configured to receive a second bias voltage.

7. The radio-frequency power amplifier of claim 3, wherein the first terminal of the first transistor and the first terminal of the second transistor are source terminals, the input transformer comprises a secondary winding with a center tap terminal configured to receive the second voltage via a power supply line, the second terminal of the first transistor and the second terminal of the second transistor are drain terminals, the inter-stage transformer has a primary winding with a center tap terminal configured to receive the first voltage, and the first transistor and the second transistor have a common gate terminal configured to receive a first bias voltage.

8. The radio-frequency power amplifier of claim 7, wherein the first terminal of the fourth transistor and the first terminal of the third transistor are gate terminals, the inter-stage transformer comprises a secondary winding with a center tap terminal configured to receive a second bias voltage, the second terminal of the third transistor and the second terminal of the fourth transistor are drain terminals, the output transformer has a primary winding with a center tap terminal configured to receive the second voltage via the power supply line, and the third transistor and the fourth transistor have a common source terminal configured to receive the third voltage.

9. The radio-frequency power amplifier of claim 7, wherein the first terminal of the fourth transistor and the first terminal of the third transistor are source terminals, the inter-stage transformer comprises a secondary winding with a center tap terminal configured to receive the third voltage, the second terminal of the third transistor and the second terminal of the fourth transistor are drain terminals, the output transformer has a primary winding with a center tap terminal configured to receive the second voltage via the power supply line, and the third transistor and the fourth transistor have a common gate terminal configured to receive a second bias voltage.

10. The radio-frequency power amplifier of claim 1, wherein a difference between the first voltage and the second voltage is less than a difference between the second voltage and the third voltage.

11. The radio-frequency power amplifier of claim 1 further comprising:
an output transformer coupled to the second amplifier stage and the first amplifier stage and configured to receive the second voltage.

12. The radio-frequency power amplifier of claim 11, wherein the second amplifier stage include a first transistor and a second transistor and the output transformer includes a first terminal coupled to the first transistor, a second terminal coupled to the second transistor, and a third terminal configured to receive the second voltage.

13. The radio-frequency power amplifier of claim 12, wherein the first transistor has a drain terminal coupled to the first terminal of the output transformer, the second transistor has a drain terminal coupled to the second terminal of the output transformer, and the third terminal of the output transformer is a center tap terminal.

14. The radio-frequency power amplifier of claim 12, wherein the first amplifier stage includes a third transistor and a fourth transistor having a common source terminal and the common source terminal of the third transistor and the fourth transistor is configured to receive the second voltage.

15. The radio-frequency power amplifier of claim 12 further comprising:
an input transformer coupled to the first amplifier stage and configured to receive the second voltage, the first amplifier stage including a third transistor having a source terminal coupled to the input transformer and including a fourth transistor having a source terminal coupled to the input transformer.

16. An electronic device comprising:
wireless communications circuitry having
a first amplifier stage having power supply terminals configured to receive a first voltage and a second voltage less than the first voltage, the first amplifier stage being configured to output a first radio-frequency signal,
a second amplifier stage having power supply terminals configured to receive the second voltage and a third voltage less than the second voltage, the second amplifier stage being configured to receive the first radio-frequency signal and output a second radio-frequency signal by amplifying the first radio-frequency signal, and
a third amplifier stage having power supply terminals configured to receive the first voltage and the third voltage, the second amplifier stage being coupled between the first amplifier stage and the third amplifier stage.

17. The electronic device of claim 16, wherein the wireless communications circuitry includes
an input transformer coupled to the first amplifier stage,
an inter-stage transformer coupled between the first amplifier stage and the second amplifier stage, and
an output transformer coupled to the second amplifier stage.

18. Wireless communications circuitry comprising:
a first amplifier stage having power supply terminals configured to receive a first voltage and a second voltage less than the first voltage, the first amplifier stage being configured to output a first radio-frequency signal;
a second amplifier stage having power supply terminals configured to receive the second voltage and a third voltage less than the second voltage, the second amplifier stage being configured to receive the first radio-frequency signal and output a second radio-frequency signal by amplifying the first radio-frequency signal; and
a third amplifier stage having power supply terminals configured to receive the first voltage and the third voltage, the second amplifier stage being coupled between the first amplifier stage and the third amplifier stage.

19. The wireless communications circuitry of claim 18 further comprising:
 an input transformer coupled to the first amplifier stage;
 an inter-stage transformer coupled between the first amplifier stage and the second amplifier stage; and
 an output transformer coupled to the second amplifier stage.

20. The wireless communications circuitry of claim 18 further comprising:
 an output transformer coupled to the second amplifier stage and the first amplifier stage and configured to receive the second voltage, wherein the second amplifier stage include a first transistor and a second transistor and the output transformer includes a first terminal coupled to the first transistor, a second terminal coupled to the second transistor, and a third terminal configured to receive the second voltage.

* * * * *